United States Patent [19]

Loeffler

[11] 4,127,959
[45] Dec. 5, 1978

[54] LOW IMPACT ANIMAL TRAP

[75] Inventor: Herbert H. Loeffler, Cambridge, Mass.

[73] Assignee: Woodstream Corporation, Lititz, Pa.

[21] Appl. No.: 815,451

[22] Filed: Jul. 13, 1977

Related U.S. Application Data

[62] Division of Ser. No. 660,387, Feb. 23, 1976, Pat. No. 4,065,871.

[51] Int. Cl.² ............................................. A01M 23/24
[52] U.S. Cl. .................................................. 43/88
[58] Field of Search ....................... 43/88, 90, 91, 96

[56] References Cited

U.S. PATENT DOCUMENTS

| 1,356,775 | 10/1920 | Manning | 43/88 |
| 1,443,309 | 1/1923 | Conner | 43/88 |
| 1,890,183 | 12/1932 | Johnson | 43/90 |
| 2,316,970 | 4/1943 | O'Neil | 43/90 |
| 3,939,596 | 2/1976 | Webley | 43/90 |

Primary Examiner—James L. Jones, Jr.
Assistant Examiner—James G. Smith
Attorney, Agent, or Firm—Holman & Stern

[57] ABSTRACT

An animal trap of the leghold type having low impact force is disclosed. The means for lessening the impact force of the jaws when they close takes one of three forms. The first is an inertial snubber. The second is an escapement mechanism. The third is a programmed control of the impact force by changing the shape of the bearing surface of the jaws on which the spring rides.

3 Claims, 18 Drawing Figures

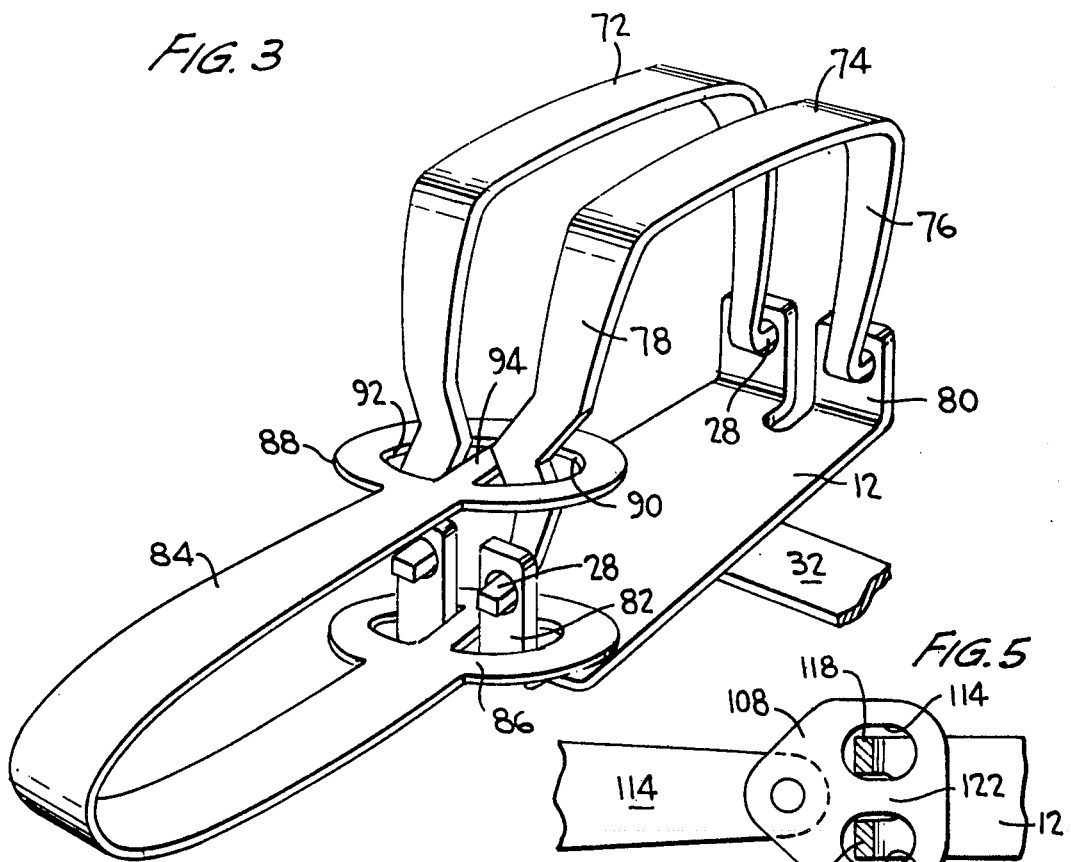

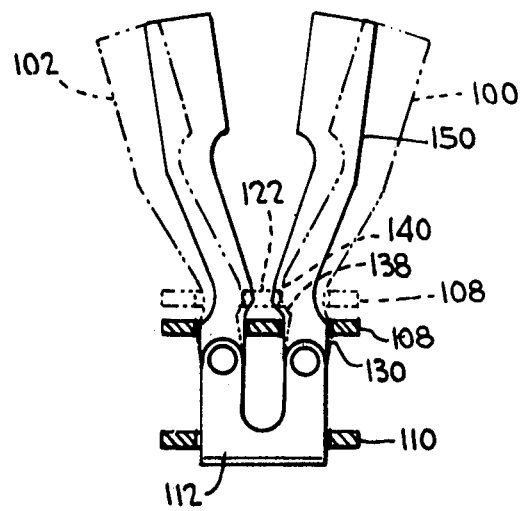
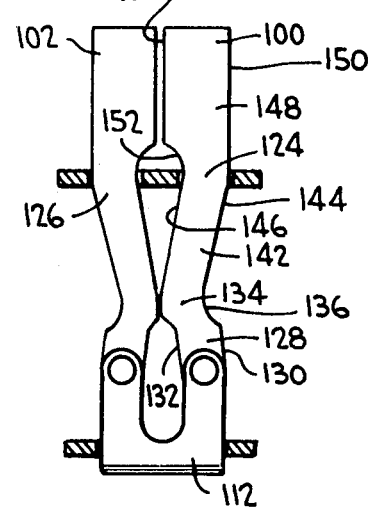
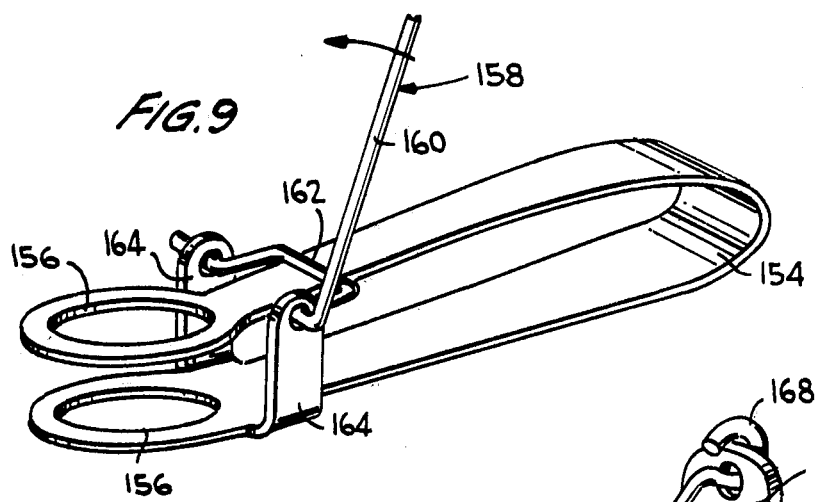
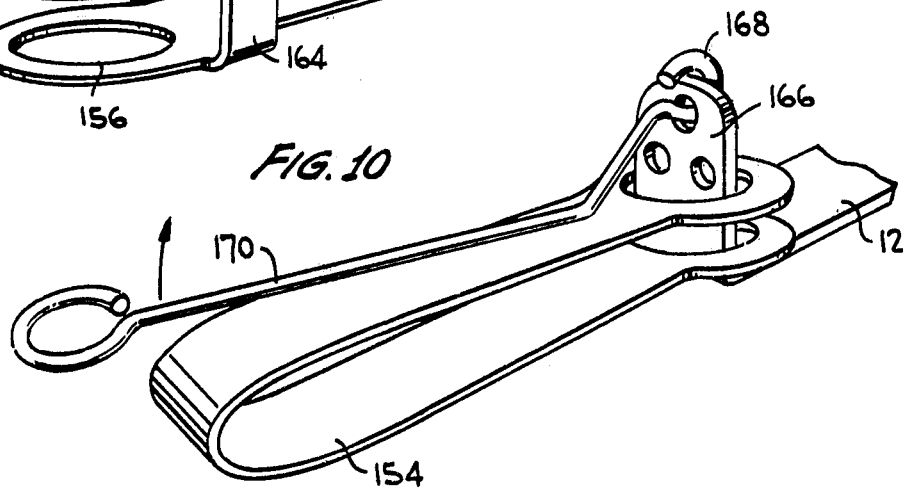

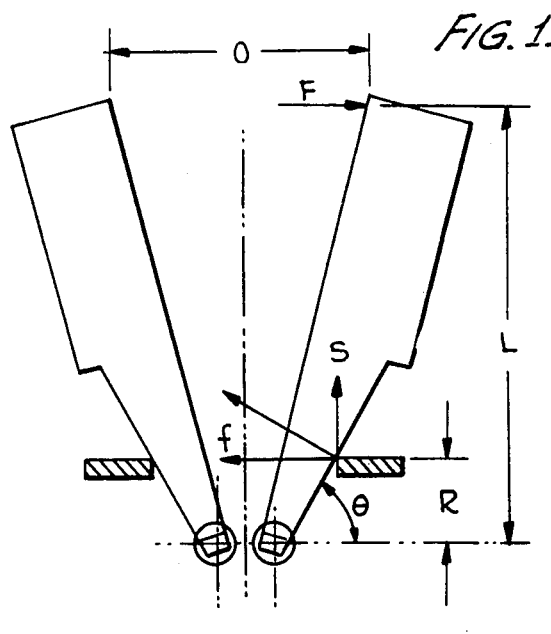

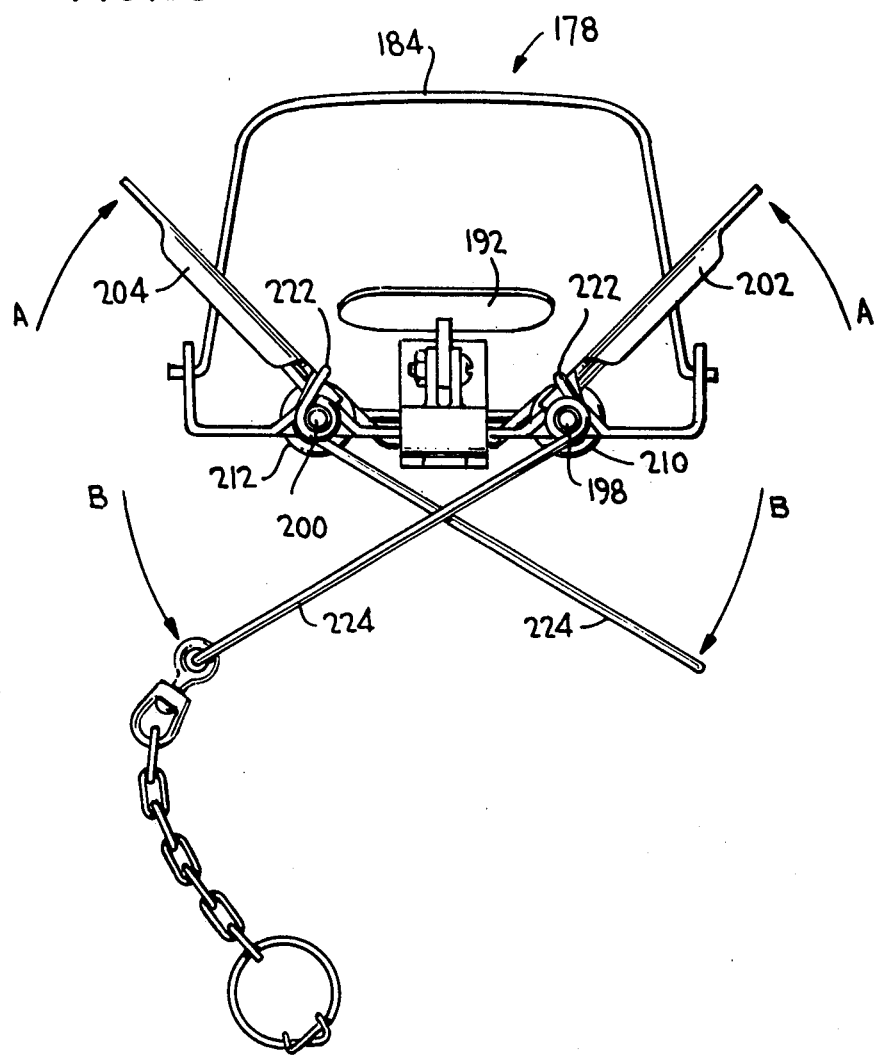

LOW IMPACT ANIMAL TRAP

This is a divisional of application Ser. No. 660,387, filed Feb. 23, 1976 now U.S. Pat. No. 4,065,871.

BACKGROUND OF THE INVENTION

This invention relates to animal traps are more particularly this invention relates to a low impact leghold type animal trap.

Leghold traps have been in use for many years in the fur trapping industry and are wide spread in their application. Depending on the size of the trap, a great variety of animals can be caught, usually without damage to the fur. These traps have recently been widely criticized because of certain aspects which are considered by some people to be inhumane. One of the most important of the disadvantages leading to the charges of inhumanity is the fact that when the jaws clamp shut on the leg of the animal, they do so with considerable force and inflict severe pain.

Interestingly, the basic design of the leghold trap has not changed over the years with new improvements being made generally in the trigger assembly or other components not affecting the operating principle of the trap. See, for example, U.S. Pat. Nos. 833,827, dated Oct. 23, 1906; 1,356,775 dated Oct. 26, 1920; 1,939,190, dated Dec. 12, 1933; and 3,335,517, dated Oct. 15, 1967.

Although there have been improvements to leghold traps over the years, the basic construction remains the same today as it was 100 years ago. Specifically, a pair of jaws pivotally mounted on a base plate are moved upwardly from the set position to the sprung position by spring means urging the jaws together. As already mentioned, it has been found that the impact force of the jaws coming together is extremely high and, in fact, unnecessarily high. In order to prove this, a technique was developed at the Laboratories of Arthur D. Little, Inc. for measuring the forces involved in these traps and a measuring apparatus was constructed.

It will be recognized that the behavior of a trap cannot be expressed as a single number. As the trap closes, the geometry varies continuously and the impact force, therefore, varies according to the size of the object between the jaws. Similarly, the clamping force after impact varies with jaw opening. Plotting the force versus the jaw opening accurately defines a trap. As will be discussed more fully hereinbelow, if means could be provided to lessen the impact forces and provide more uniform clamping force at smaller openings of the trap, the standard leghold trap can be made more humane.

Accordingly, it is a primary object of the present invention to provide a leghold type trap which operates in a more humane manner than the prior art traps.

It is another object of the present invention to provide a leghold type trap wherein the clamping force of the jaws is materially reduced at smaller openings.

It is yet another object of the present invention to provide a leghold type trap wherein the impact force of the jaws is reduced.

BRIEF DESCRIPTION OF THE DRAWINGS

This invention will be better understood and objects other than those set forth above will become apparent when consideration is given to the following detailed description thereof. Such description makes reference to the annexed drawings wherein:

FIG. 3 is a perspective view of another configuration of a trap according to the first embodiment;

FIG. 4 is a side elevation, partially fragmented, of another configuration of a trap according to the first embodiment;

FIG. 5 is a sectional view taken along the line 5—5 of FIG. 4;

FIG. 6 is a sectional view taken along the line 6—6 of FIG. 4, with the trap in the set position;

FIG. 7 is similar to FIG. 6 but with the trap partially closed;

FIG. 8 is similar to FIGS. 6 and 7 with the jaws in the closed position;

FIG. 9 is a perspective view of a spring and damper means according to a second embodiment of the present invention;

FIG. 10 is a perspective view of a spring and damper means and part of a trap according to another configuration of the second embodiment of the present invention;

FIG. 11 is an end view, partly in section, of a prior art trap with the jaws half closed;

FIG. 12 is an end view, partially in section, of a trap according to another embodiment of the present invention;

FIG. 13 is a curve showing calculated forces against jaw opening of a prior art trap and a trap according to the third embodiment of the present invention;

FIG. 14 is a curve showing the actual forces plotted against jaw opening of the prior art trap and the trap according to the third embodiment of the present invention;

FIG. 18 is a front view of the trap of FIG. 15 in the closed position.

SUMMARY OF THE INVENTION

According to the present invention, an animal trap of the leghold type is provided having a base, a pair of U-shaped coacting jaws swingably mounted on the base, spring means biasing the jaws to a closed position, trigger means for locking the jaws in an open position until released and means for reducing the impact of the jaws when they close without significantly reducing the closing speed or holding power. In one embodiment, an inertial snubber is mounted in such a way as to absorb excess energy from the spring immediately before impact of the jaws. In another embodiment, the jaws are shaped to provide an escapement and the lever or spring riding up the jaws is made to contact the escapement so that as the jaws close a point will be reached whereat the jaws momentarily reverse their direction thereby dissipating excess energy. In another embodiment the shape of the jaws is programmed in such a way that the energy curve will remain fairly constant.

DETAILED DESCRIPTION OF THE PREFERRED EMBODIMENTS

Figure 1:
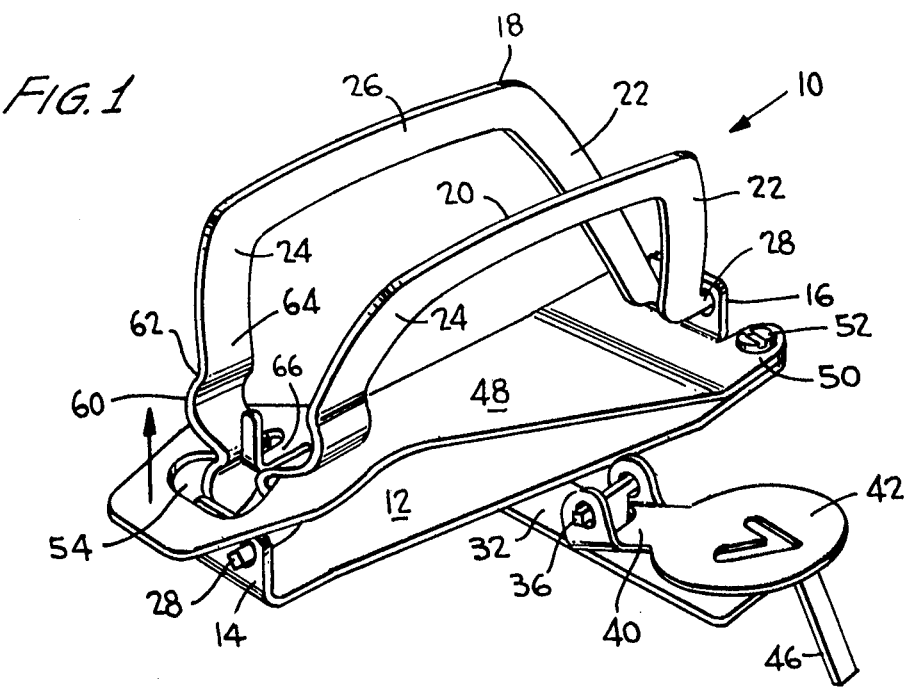
FIG. 1 is a perspective view of a trap according to one embodiment of the present invention.

Referring first to FIG. 1, there is shown a jump trap generally designated by the numeral 10 which has a base 12 having elongated first and second ears 14 and 16 at the ends thereof and a pair of jaws 18 and 20. Jaws 18 and 20 each comprises a pair of substantially parallel spaced legs 22 and 24 and crossmember 26. The legs 22 and 24 terminate in laterally outwardly directed pintles 28 journaled through bores 30 in ears 14 and 16. Affixed to the longitudinal base 12 is a lateral crosspiece 32. Upstanding from cross-piece 32 is leg 34 having pintles 36 journaled through bores 38 in the shank 40 which is integral with the pan 42. Extending upwardly and outwardly from one end of cross-piece 32 is an extension 44 carrying dog 46.

Figure 2:
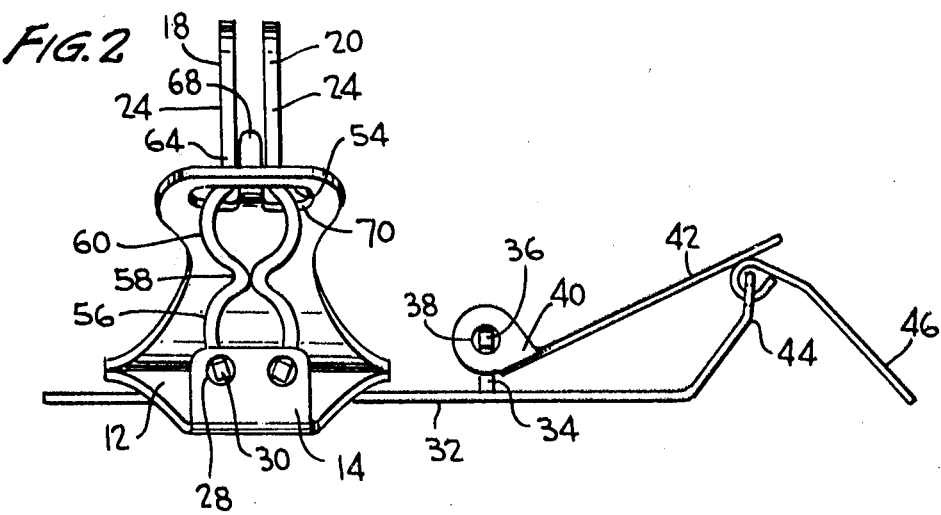
FIG. 2 is an end view of the trap of FIG. 1.

It will be seen that legs 22 are relatively straight extending downwardly from cross-member 26 to pintle 28. In the prior art trap legs 24 would have the same configuration. The last essential member of the trap is a spring which, in the embodiment of FIG. 1, is shown as a jump spring 48 which is in the form of a leaf spring affixed to base 12 at the end 50 which is in the approximity of legs 22. Spring 48 is affixed to base 12 by any suitable means such as rivets or screws 52. Spring 48 terminates at the other end portion in opening or eye 54 the shape of which will be described more fully hereinbelow. It will be recognized, however, that in the prior art traps the eye 54 is generally circular so that when the trap is set with the spring forced into a position against base 12 and the jaws are spread apart and held in place by pan and shank assembly 40, 42 and dog 46 (see FIG. 6), and the trap is released, the end portion of spring 48 carrying eye 54 will move rapidly upwardly and urge legs 24 into the upright and closed position. But, in this embodiment of the present invention, it is noted that legs 24, when together in an upright position and viewed from the end as in FIG. 2, generally conform to an "hour glass" shape. That is, each of the legs 24 has a pintle 28 and then curves outwardly for a short distance at 56, inwardly at 58, outwardly at 60, and inwardly again at 62 to where the substantially straight portion 64 begins. The eye 54 of spring 48 has a longitudinally extending cross-piece 66 extending between legs 24 and terminating in an upwardly extending portion 68.

Thus, in use, the trap is set as already explained and when triggered by an animal, spring 48 moves upwardly with outer wall 70 of eye 54 riding along portion 56 of legs 24 thereby urging the jaws to a closed position. However, when eye 54 reaches the portion 58 of legs 24, the direction of the jaws is suddenly reversed so that they momentarily begin to open again. But, as eye 54 reaches portion 60 of legs 24, the jaws are again urged to a closed position. This momentary opening of the jaws in the middle of their closing travel absorbs or dissipates considerable energy which is essentially unusable energy in terms of the necessary clamping force to hold an animal and diminishes the impact. The loss in closing time caused by this momentary reverse motion is negligible. The direction of travel of jaws, therefore, is, in essence, controlled by an escapement.

Referring to FIG. 3, there is seen another configuration of a trap falling within the definition of the first embodiment of the present invention already described. This trap comprises base 12 and jaws 72 and 74. Each of the jaws has a leg 76 and an opposite leg 78 each journaled by means of pintles 28 into upstanding ears 80 and 82. Cross-piece 32 holds the pan and shank assembly and dog (not shown). It will be seen that legs 76 are substantially straight while legs 78 form a similar escapement to that shown in FIG. 1. Instead of a jump spring as shown in FIG. 1, the configuration of FIG. 3 shows a long spring 84 which is also a leaf spring. Leaf spring 84 has a stationary end 86 and a slidable end 88. End portion 88 has a pair of eyes 90 and 92 separated by a cross-piece 94. The operation of this trap is the same as the operation of the trap of FIG. 1 with end portion 88 of spring 84 moving upwardly when the trap is released and urging the jaws together for the first part of their travel, momentarily apart, and then together again.

Referring now to FIGS. 4 through 8, there is seen another configuration of a trap according to this first embodiment of the invention. In this trap, base 12 is provided with upstanding ears 96 and 98 into which pintles 28 of jaws 100 and 102 are journaled. Cross-piece 32 having upstanding ears 34 and 44 carrying pan and shank assembly 42 and 40, and dog 46, respectively, are the same as previously described.

As shown in FIG. 4, partially fragmented for ease of illustration, a long spring basically similar to that shown in FIG. 3 is used having upper portion 104 and lower portion 106 which, in turn, are fixed to eye members 108 and 110, respectively. Eye member 110 merely contains an elongated slot to fit over base portion 112 of ear 98. Eye member 108, however, has a pair of eyes 114 and 116 (FIG. 5) to fit over ear portions 118 and 120, respectively (FIGS. 5 and 6). Between eyes 114 and 116 is cross-piece 122.

As can be clearly seen in FIG. 8, the configuration of legs 124 and 126 of jaws 100 and 102, respectively, includes a lower foot portion 128 having substantially parallel linear outer surface 130 and inner surface 132. Moving upwardly from foot portion 128, there is a first intermediate portion 134 projecting inwardly and having a curved outer surface 136 and rectilinear inner surfaces 138 and 140, which can be more easily recognized by reference to FIG. 6. Again moving upwardly, there is second intermediate portion 142 defined by substantially parallel linear outer and inner surfaces 144 and 146, respectively. Finally, there is upper portion 148 which is defined at its outer surface by linear edge 150 and at its inner surface by curved surface 152 which is transformed to linear surface 154, linear surface 154 being substantially parallel to linear surface 150.

For ease in understanding the operation of this trap, attention is directed to FIGS. 6 through 8, and in particular to FIG. 7. In FIG. 6, the trap is shown in its set position with jaws 100 and 102 fully open and held in place by the locking mechanism which comprises the pan 42, shank 40, and dog 46. This, in turn, compresses the spring which is held in position by surface 130 of legs 124 and 126 of the jaws 100 and 102. Considering FIG. 7, when the jaws are released and the spring begins to move upwardly, member 108 moving upwardly and bearing against surface 130 urges the jaws up and toward are closed position. As the member 108 moves to the position shown in phantom in FIG. 7, portion 122 becomes the operative factor and, by bearing against surfaces 138 and then 140, it reverses the direction of travel of the jaws and urges them slightly more open to the position shown in phantom in FIG. 7. As member 108 continues to rise, it bears against surface 144 to close the jaws and hold them in a closed position as shown in FIG. 8.

Thus, it will be seen that each of the traps shown in FIGS. 1 through 8, while having a slightly different configuration, operates in essentially the same way. It will be appreciated, also, that while these traps are shown and described by reference to particular type of spring, that is, a jump spring or a long spring, the actual type of spring is immaterial and they may be interchanged. In fact, a coil spring type trap having a lever of the type shown in FIG. 15 could be used in this embodiment.

Turning to the next embodiment, attention is directed to FIG. 9 which merely shows a prior art type long spring 154 terminating at either end in an eye 156. This spring when used in the conventional manner is mounted essentially as shown in FIG. 3 but, of course, using the conventionally shaped jaws which will be appreciated by referring to FIG. 11 or to any of the prior art patents cited above. At this point it is important to keep in mind the basic principles underlying the various embodiments of the instant invention. Specifically, it must be understood that a leghold trap must grip a captured animal's leg with sufficient force to prevent escape. A spring strong enough to provide this force, however, liberates considerable energy when the trap is triggered and most of this energy is absorbed by the animal's leg. Thus, it is important to be able to dissipate excess energy harmlessly without compromising the gripping power of the spring. With this in mind, and returning to FIG. 9, there is provided a damper or snubber generally designated by numeral 158 which comprises an inertia arm 160 extending outwardly from a crank 162 rotating in upstanding legs 164. In operation, the trap begins to close in the conventional manner, the jaws being driven together by a leaf spring, either of the long spring or the jump spring type. Before the jaws contact the animal's leg, however, the spring encounters the crank 162. The spring must turn the crank, accelerating inertia arm 160 in order to continue its own motion. Since the arm 160 has higher inertia than the jaws, the spring essentially lags behind the jaws and softly clamps the same shut after they have already closed due to their own momentun.

FIG. 10 shows another form of inertial damper or snubber. In this modification, provision is made in ear 166 which is upstanding from base 12 of the trap for inserting hook means 168 of inertial snubber 170. Again, as the spring rises, it contacts inertial snubber 170 imparting excess energy to it and lagging behind the jaws which close gently and then become clamped by the spring.

Before discussing the next embodiment of the instant invention, it would be helpful to briefly describe certain of the factors involved in the use of a typical leghold trap. For this purpose, a standard Victor number 3 long spring trap was used. It will be appreciated by one skilled in the art that the principles involved apply to any size trap of the leghold type and that this discussion by reference to a number 3 trap is for illustrative purposes only. FIG. 11 shows the geometry of the trap jaws in the standard trap. The expression $F = fR/L$ gives the static clamping force at any opening. The expression $F = S\tan\theta$ describes the relationship between the jaw angle and the spring force. In these calculations, friction was ignored, as was the minor variation in spring force, since neither factor would have much effect on the basic relationships.

The "standard #3" curve in FIG. 13 shows the results of a series of calculated data points. One sees a drastic increase in force at less than half inch opening. This would be likely to severely injure small animals, while allowing larger ones to escape. Redistributing the spring force in a more reasonable distribution is shown on the second curve of FIG. 13, marked "Modified Jaw #3 Trap". This was arrived at by selecting desired values of F as $\theta$ varied. Returning to the formula $F = fR/L$, L barely varies, and both f and R vary with $\theta$:

$$f = S\tan\theta$$

$$R = K\sin\theta$$

Therefore, varying $\theta$ will produce any desired value of F.

Following the above formula, jaws were fabricated as shown in FIG. 12. In this case, jaws 172 and 174 each have a lower portion 176 having a curved outer surface denoted as "C". It will be appreciated, therefore, that as the eye of the spring moves upwardly along surface C urging the jaws closed, $\theta$ constantly changes. In the particular example, using a number 3 trap, curved surface C was arcuate. Measurements were then taken on an instrument measuring force in millivolts, the instrument having previously being calibrated so that 1.84 millivolts was equal to 1 pound. Jaw opening was plotted against force for both the standard trap and the trap with the jaws modified as in FIG. 12. The curves are set forth in FIG. 14 it was not possible to take measurements at extremely small jaw openings because of the size of the sensor. It will be seen, however, that the curve for the standard trap is essentially as calculated and shown in FIG. 13 and the curve for the modified jaw trap essentially follows that predicted as in FIG. 13 and, in fact, was somewhat more level. Clearly, therefore, the impact force of the jaws closing, regardless of the distance between the jaws at the time of closing on the leg of an animal, is held relatively constant and at a relatively low level. In a sense, the jaws can be "programmed" to provide any desired force curve.

Figure 15:
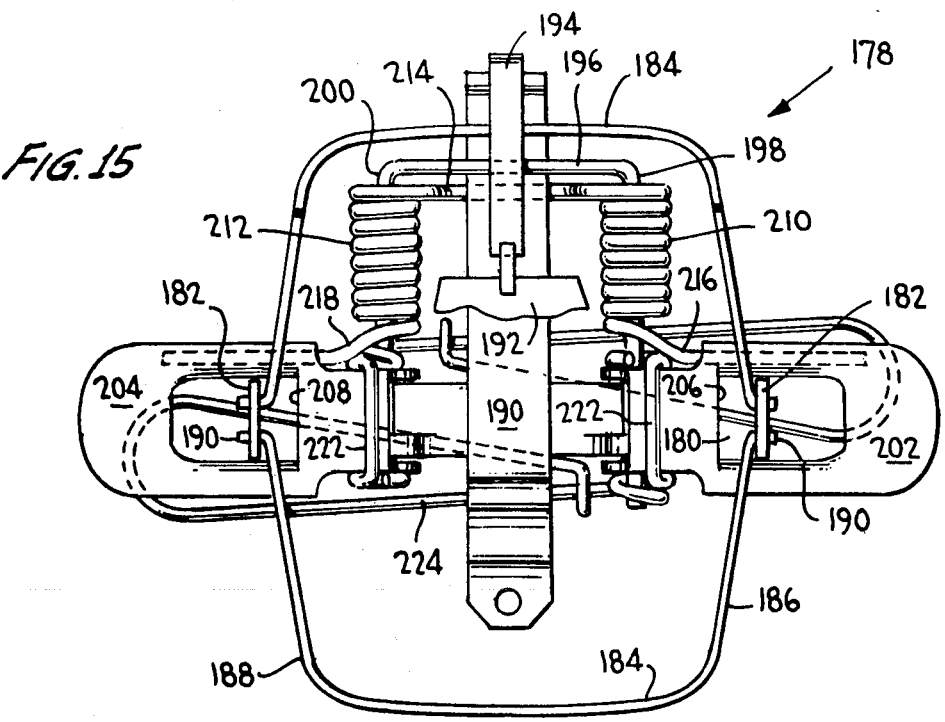
FIG. 15 is a plan view of a trap according to still another embodiment of the present invention with the trap in the set position.
Figure 16:
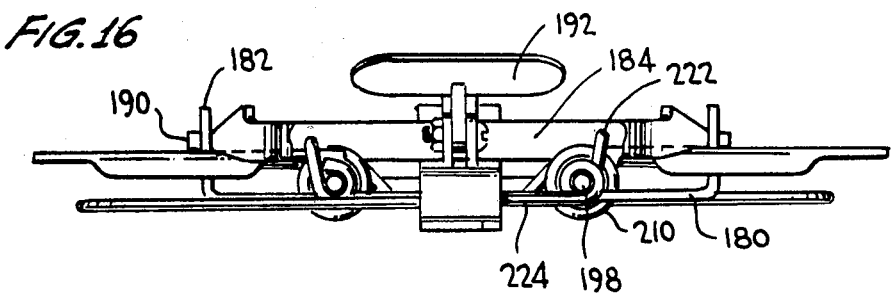
FIG. 16 is a front view of the trap of FIG. 15 with the trap in the set position.

Turning now to FIG. 15, there will be seen a leghold trap of the coil spring type. This trap is shown with two springs but this embodiment could be used with a single coil spring of the type shown in Montgomery et al Pat. No. 3,335,517. This trap which is generally designated by the numeral 178 comprises a base 180 having upstanding ears 182; jaws 184 comprising a pair of substantially parallel spaced legs 186 and 188 terminating in laterally outwardly directed pintles 190 which are journaled through bores in ears 182; and cross-piece 190 carrying pan and shank assembly 192, with the pan partially broken away for clarity of illustration, and dog 194. A generally U-shaped spring mount 196 is mounted on cross-piece 190 and base 180 in such a way that the legs 198 and 200 are aligned transversely of base 180 and equidistant from cross-piece 190. Levers 202 and 204 are mounted to pivot on legs 198 and 200, respectively, of mount 196. Levers 202 and 204 are provided with openings 206 and 208, respectively, which correspond to the eyes 156, for example, of spring 154 shown in FIG. 9. Also mounted on legs 198 and 200 are coil springs 210 and 212 which are joined at their far ends by member 214. At the ends of the coil springs 210 and 212 closest to base 180, end portion 216 and 218 is fixed to the underside of lever 202 and 204, respectively, so that the levers are normally biased in an upward position as shown in FIG. 18. As shown in FIG. 15, on the other hand, the trap is in the set position and the levers are down and the jaws wide open.

Figure 17:
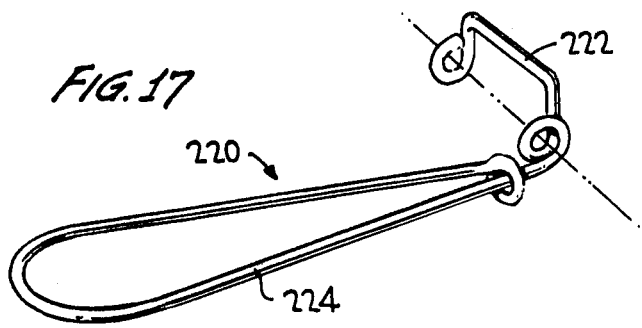
FIG. 17 is a perspective view of the damper means used in the trap of FIG. 15.

To this point, the description of the trap of FIGS. 15 through 18 has been a description of a conventional coil spring leghold trap. But, according to the last embodiment of the present invention, a pair of inertial snubbers or dampers is provided which relies on the mass of the trap itself to provide the inertial damping. The inertial snubber is shown in FIG. 17 and is generally designated by the numeral 220. It comprises a crank portion 222 and an arm portion 224. As will be seen from FIG. 15, snubber 220 is mounted in such a way that crank 222 rides on lever 202 or 204 and is mounted to pivot about the axis provided by members 198 and 200. Arm 224, when the trap is in the set position lays flat on the ground with the weight of the trap itself on top of the same. This can be easily seen in FIG. 16.

Turning to FIG. 18, it will be seen that when the trap is sprung, levers 202 and 204 are urged upwardly in the direction shown by arrows A by springs 210 and 212 thereby urging jaws 184 together. At the same time, however, cranks 222 are contacted by levers 202 and 204 and caused to rotate about pivots 198 and 200, respectively. As cranks 222 rotate, arms 224 move in the direction shown by the arrows labelled B. Since the trap 178 is resting on arms 224, when arms 224 are caused to move as shown by arrows B, the trap itself is displaced upwardly. The mass of the trap 178 causes an inertial dampening of levers 202 and 204 which then lag behind the closing of the jaws 184. Jaws 184 close gently on the animal's leg and then are tightly clamped by levers 202 and 204. An additional advantage of this action is that the upward movement of the complete trap will cause the jaws to close higher up on the animal's leg thereby creating a more positive grip as well as a less painful grip. Additionally, if the animals pulls its leg away from the trap when it is startled, the trap, in essence, follows this action and still grips the animal's leg.

While this invention has been particularly shown and described with reference to preferred embodiments thereof, it will be understood by those skilled in the art that various changes in form and details may be made therein without departing from the spirit and scope of the invention.

Accordingly, what is claimed is:

1. In an animal trap of the leghold type having a base, a pair of U-shaped coacting jaws swingably mounted on said base, spring means biasing said jaws to a closed position, and trigger means for locking said jaws in an open position until released, the improvement comprising means for reducing the impact of said jaws when they close without significantly reducing the closing speed or holding power, said base being elongated and having upstanding first and second ears at the ends thereof; said jaws each comprising a pair of substantially parallel spaced legs and a cross member, said legs terminating in laterally outwardly directed pintles journalled through bores in said ears; said spring means being a leaf spring and comprising an eye at one end thereof, said eye encircling one leg of each jaw so that when said jaws are in the open position and said spring is released the eye thereof rides up said one leg of each jaw to thereby close said jaws, said impact reducing means comprising escapement means, said escapement means comprising said one leg of each jaw being offset inwardly toward the other at one portion thereof, and a cross-bar through said eye of said spring and passing between said one leg of said jaws, whereby when said trigger is released said spring moves along said one leg to close said jaws, when said spring reaches the offset portion of said legs, the direction of travel of said legs is momentarily reversed, and when said spring passes said offset portion of said legs said jaws resume their original direction of travel to thereby close with reduced impact.

2. The improvement of claim 1, wherein said spring is a jump spring.

3. The improvement of claim 1, wherein said spring is a long spring.

* * * * *